United States Patent [19]

Chapiro et al.

[11] 3,839,172

[45] Oct. 1, 1974

[54] RADIATION GRAFTING OF ACRYLIC MONOMERS ONTO PERHALOGENATED OLEFIN POLYMERIC SUBSTRATES

[75] Inventors: Adolphe Chapiro, Bellevue, France; Peter Seidler, Pfalz, Germany

[73] Assignee: L'Agence Nationale De Valorisation De La Recherche, Neuilly-sur-Seine, France

[22] Filed: July 29, 1971

[21] Appl. No.: 167,528

Related U.S. Application Data

[63] Continuation-in-part of Ser. No. 85,244, Oct. 29, 1970, abandoned, which is a continuation of Ser. No. 363,619, April 29, 1964, abandoned.

[30] Foreign Application Priority Data

June 25, 1963 France .......................... 63.939305

[52] U.S. Cl. .......... 204/159.17, 260/2.2 R, 260/884
[51] Int. Cl. .......................... B01j 1/00, C09d 1/00
[58] Field of Search ........................ 204/159.17, 884

[56] References Cited
UNITED STATES PATENTS

| | | | |
|---|---|---|---|
| 2,999,056 | 9/1961 | Tanner | 204/159.12 |
| 3,008,920 | 11/1961 | Urcluck | 204/159.17 |
| 3,099,631 | 7/1963 | Tanner | 260/836 |
| 3,257,334 | 6/1966 | Chen et al. | 260/886 |
| 3,627,657 | 12/1971 | Nistri et al. | 204/159.23 |

*Primary Examiner*—Murray Tillman
*Assistant Examiner*—Richard B. Turer
*Attorney, Agent, or Firm*—Burgess, Dinklage & Sprung

[57] ABSTRACT

Novel method of making a semi-permeable membrane having a perhalogenated olefin substrate by grafting onto such substrate acrylic acid or other hydrophilic acid groups. The grafting is accomplished by forming a grafting medium comprising water, olefinically unsaturated hydrophilic acid moiety and an inorganic polymerization inhibitor for the homopolymerization of said hydrophilic acid which is a salt of a polyvalent metal; immersing perhalogenated olefin polymer substrate in the grafting medium; and then subjecting such to ionizing radiation sufficient to cause grafting of said hydrophilic acid onto said perhalogenated olifin polymer substrate.

5 Claims, No Drawings

RADIATION GRAFTING OF ACRYLIC MONOMERS ONTO PERHALOGENATED OLEFIN POLYMERIC SUBSTRATES

This application is a continuation in part of application Ser. No. 85,244 filed Oct. 29, 1970, now abandoned which is in turn a streamlined continuation of application Ser. No. 363,619 filed Apr. 29, 1964, now abandoned.

This invention relates to semi-permeable membranes. It more particularly refers to such membranes having as a substrate base, a shaped article, preferably a film or sheet, of a perhalogenated olefin polymer.

Semi-permeable membranes are used in electrolytic operations, such as for example in desalting sea water, in electrolytic cells, in fuel cells and in other similar applications. It is known to be desirable for such semi-permeable membranes to have high chemical resistance and significant mechanical strength in order to maximize the economics of the system in which they are used.

Perhalogenated olefin polymers, such as polytetrafluoroethylene, sold under the trademark Teflon, and polytrifluoromonochloroethylene, sold under the trademark Kel-F, are known to be extremely passive chemically. Therefore, it is obviously desirable to use these materials in any and all applications which call for shaped articles which are substantially inert chemically. Thus, it would be desirable to use perhalogenated olefin polymer films or sheeting in the semipermeable membrane field, particularly as the membranes themselves. Unfortunately, the extreme chemical inertness which recommends these materials so highly also works against them in that they are not per se semi-permeable to aqueous media of any type nor are they particularly reactive with any other materials which would modify their properties to a degree sufficient to make them available for use in the semi-permeable membrane field.

It is generally known that good semi-permeable membranes for use in aqueous systems should be hydrophilic. Perhalogenated olefin polymers are quite hydrophobic. It would, therefore, be desirable to in some way convert hydrophobic perhalogenated olefin polymers to a more hydrophilic state while at the same time retaining their chemical passivity.

It is, therefore, an object of this invention to provide a novel means of producing semi-permeable membranes.

It is another object of this invention to provide a novel technique of modifying the physical properties of preformed shaped articles of perhalogenated olefin polymers.

It is a further object of this invention to produce hydrophilic perhalogenated olefin polymer shaped articles.

It is a still further object of this invention to provide a novel technique for graft copolymerizing preformed perhalogenated olefin polymer with a hydrophilic monomer.

Other and additional objects of this invention will become apparent from a consideration of this entire specification including the claims hereof.

In accord with and fulfilling these objects, one aspect of this invention resides in grafting hydrophilic acid groups onto a preformed substrate of perhalogenated olefin polymer. This is generally accomplished by forming a grafting medium comprising water, a water soluble polymerizable olefinically unsaturated hydrophilic acid monomer and an inorganic polymerization inhibitor for the homopolymerization of said monomer; immersing a preformed shaped article of perhalogenated olefin polymer into said grafting medium; and then irradiating the immersed article and grafting medium with high energy ionizing radiation in an amount and for a time sufficient to graft the monomer not only onto the surface of the performed perhalogenated olefin polymer shaped article but also through substantially all of its thickness.

High energy ionizing radiation as the term is used in this application is intended to cover x-rays, gamma rays, accelerated particles, radioactive isotope emissions and other similar types of radiation. The radiation dosage is, of course, dependent to some extent upon the particular monomer being grafted and the particular polymer being grafted upon. In general the radiation dosage should be about $10^2$ to $10^6$ rads. More particularly, and especially in the case of grafting acrylic acid onto polytetrafluoroethylene in a water solution containing ferrous ammonium sulfate polymerization inhibitor, radiation doses of $10^3$ to $5 \times 10^5$ rads are preferred.

The hydrophilic acid monomers which are useful in this invention are those which have addition polymerizable olefinic unsaturation therein, particularly organic carboxylic acids. These acids should be water soluble at least to an appreciable extent. Thus, acrylic acid, methacrylic acid, ethacrylic acid, crotonic acid, maleic acid, and the like are exemplary of the olefinic carboxylic acids which are useful in this invention.

The polymerization inhibitor is quite critical to the practice of this invention. In fact with acid like acrylic acid, there is some considerable doubt whether grafting can occur onto polytetrafluoroethylene without the presence of an inhibitor for the homopolymerization of the acrylic acid. Suitably, the inhibitors are inorganic salts of polyvalent metals, particularly copper or iron salts. It has been found that ferrous ammonium sulfate and copper chloride are particularly useful in this regard. Surprisingly it has been found that some materials which are generally recognized as polymerization inhibitors, such as hydroquinone, have been found not to be suitable for use in this invention at all because they do not effectively inhibit the homopolymerization of the grafting monomer. Other materials which are known polymerization inhibitors, such as benzoquinone, have also been found to be unsuited to use in this invention because they not only inhibit the homopolymerization of the grafting monomer but in addition also inhibit the grafting of these monomers onto the perhalogenated olefin polymer substrate.

It is preferred accoding to this invention to utilize as the substrate being grafted onto, a film or sheet of perhalogenated olefin polymer which has a substantially uniform thickness and is already of a size and thickness suited to the final use to which it will be put. The use of uniform thickness sheets of substrate tends to insure the substantially uniform grafting of the hydrophilic monomer throughout the substrate thickness whereby effectively modifying the properties of all of the substrate, not only the surface portions. This is of particular importance where the grafted product is to be used as a semi-permeable membrane.

The grafting is preferably carried out with the substantial exclusion of oxygen. This can be accomplished by operating in a vacuum environment or operating with an inert gas atmosphere. As a practical matter, the grafting medium is disposed in a container, the substrate is immersed in the grafting medium, and the container is degassed, as, for example, by repeated freezing and thawing with a mercury diffusion pump followed by liquification. Thereafter the container is sealed and the sealed container subjected to appropriate high energy ionizing radiation, within the parameters set forth above, until the hydrophilic monomer has grafted onto the substrate to a required, predetermined depth, preferably all the way through the substrate.

In order to facilitate grafting of the hydrophilic monomer throughout the thickness of the perhalogenated olefin polymer substrate, the graft copolymerization conditions, particularly the intensity of radiation, the duration of radiation, the amount of inhibitor and the amount of water in relation to the amount of monomer and of substrate and the temperature of the grafting, should be so regulated that the speed of homopolymerization of the monomer is less than the speed of grafting of the monomer onto the polyperhalogenated ethylene backbone and is less than the speed of penetration of the monomer into the interstices of the graft copolymer as it is formed.

While not being bound by any particular theory of operation, it is believed that, while perhalogenated olefin polymer articles are substantially impervious to hydrophilic acid or to aqueous solutions with or without inorganic polymerization inhibitor therein, perhalogenated olefin polymer to which has been grafted hydrophilic acid units is relatively pervious to aqueous solutions of the hydrophilic monomer. Thus it is believed that the hydrophilic acid monomer initially actually grafts onto the surface of the substrate thereby creating a graft copolymer thereon to a very shallow depth. This graft copolymer is pervious to aqueous solution of further hydrophilic acid monomer which then penetrates through the graft copolymer layer to graft onto additional perhalogenated olefin polymer which then becomes available. Thus the inhibitor and the water coupled with the intensity of radiation must cooperate to maintain a higher speed of grafting and penetration than homopolymerization.

After the grafting has been completed to a preferred redetermined depth, preferably all the way through the thickness of the perhalogenated olefin polymer substrate, the ionizing radiation is cut off and the grafting thus stopped. The graft copolymer shaped article is then washed and any unreacted monomer and/or homopolymer removed therefrom. The product which results is then used in a conventional manner as are other, known semi-permeable membranes as for example for ion exchange.

The graft copolymer sheets made according to this invention are particularly useful as semi-permeable membranes in all applications in which high resistance to chemical corrosion, heat and/or mechanical stress is required or desired. Because the membranes produced according to this invention substantially retain the excellent chemical inertness of polyperhalogenated olefins, it is possible to use them to great advantage in electrolytic processes. It is particularly advantageous to use these membranes with highly concentrated electrolytes. The thermal stability of these membranes is such that electrolysis can be carried out at elevated temperatures, which may in some cases be quite advantageous in that outputs per unit of time can be improved. Another distinct advantage to the semi-permeable membranes of this invention is the fact that they are generally rupture resistant whereby permitting operation of electrolytic processes under elevated pressure conditions which might damage prior art membranes.

It is a further embodiment and fully within the scope of this invention to mask a portion of the perhalogenated olefin polymer substrate during irradiation in order to provide a product having some semi-permeable hydrophilic areas and some impervious hydrophobic areas. The ungrafted, impervious portion of the product may serve as a seal or gasket suitable for mounting or the like. The ungrafted portion of the product may, for example, constitute a marginal zone or peripheral strip which can be clamped between appropriate contact surfaces to form an effective sealing joint. This is particularly helpful since the ungrafted portion of the sheet will not swell in water or aqueous solutions and which, therefore, maintains an excellent seal.

Masking may be accomplished by physically covering those portions of the substrate where grafting is not desired with a material which prevents contact of the grafting medium with the substrate. Alternatively, means may be provided to restrict the impingement of high energy ionizing radiation onto the substrate either by masking the source or by covering the substrate with a material which is substantially impervious to the high energy ionizing radiation.

The following Examples will serve to illustrate and evidence this invention without being in any way limiting thereon. In these Examples, parts and percentages are by weight unless expressly stated to be on some other basis. In Examples 1 through 7, the high energy ionizing radiation was effected by the use of a cobalt 60 source of 100 curies.

EXAMPLE 1

A rectangular sheet of polytetrafluorethylene, measuring 4 × 6 cm., 0.1 mm. thick, and weighing 0.522 grams, is placed in a Pyrex glass bottle 16 mm. in diameter. 15 cc of an aqueous solution of 50 percent acrylic acid containing 0.25 g of Mohr's salt (ferrous ammonium sulfate) per 100 cc of solution, is added to the bottle so as to completely immerse the polytetrafluorethylene sheet. The Mohr's salt is a homopolymerization inhibitor for the acrylic acid. The bottom is then degassed by repeating thrice the known cycle of freezing, degassing with a mercury diffusion pump, and liquefaction; then the bottom is sealed and irradiated at 20° C for 45 hours at an intensity of 24 rads per minute. The sheet is then removed from the bottle and washed for 24 hours with distilled water in a Soxhlet extractor. The dried sheet weighed 0.612 g and contained 15 percent by weight of acrylic acid. When placed in water at 20° C, it swelled and was capable of absorbing about 7 percent of its weight in water. When neutralized with caustic soda, it was capable of absorbing about 40 percent of its weight in water. It has therefore become semi-permeable.

EXAMPLE 2

Proceeding in precisely the same way as in Example 1, but prolonging the time or irradiation to 63 hours, instead of 45, a graft of 17 percent by weight of acrylic acid was obtained in the polytetrafluoroethylene sheet.

EXAMPLE 3

By proceeding in precisely the same way as in Example 1, but prolonging the time of irradiation to 110 hours instead of 45, a grafting is obtained of 18 percent by weight of acrylic acid in the polytetrafluoroethylene sheet.

EXAMPLE 4

The procedure is the same as in Example 1, but the ionizing irradiation is performed at 50° C at an intensity of 30 rads per minute. In these conditions, at the end of only 14 hours of irradiation, a graft has been obtained of 13 percent by weight of acrylic acid in the polytetrafluoroethylene sheet. Thes example shows the importance of treatment at a higher temperature than the ambient.

EXAMPLE 5

The procedure is the same as in Example 1, with the sole difference that the intensity of the ionizing radiation is increased to 122 rads per minute instead of 30. In this case it is found that, at the end of 14 hours, a graft has been obtained of 16 percent by weight of acrylic acid in the polytetrafluoroethylene sheet as in Example 2.

EXAMPLE 6

The above examples may be repeated using polytrifluoromonochlorethylene in place of thepolytetrafluorethylene and comparable results will be obtained.

EXAMPLE 7

The above examples may be repeated using methacrylic acid in place of the acrylic acid and comparable results will be obtained.

EXAMPLES 8-13

The following Examples were conducted to try to graft acrylic acid onto a preformed polytetrafluoroethylene sheet 0.1 mm. thick. Irradiation was by means of gamma rays at a dose rate of 1.5 rads per minute.

| Ex. No. | Monomer Solution | Hours of irradiation | Total irradiation (rads) | Weight Gain of PFTE Film | Observations Appearance of material around film |
|---|---|---|---|---|---|
| 8 | Acrylic acid (pure) | 3.5 | 315 | 0 | Solid bloc of poly (acrylic acid) around film |
| 9 | Acrylic acid (pure) | 1.0 | 90 | 0 | Abundant precipitate of poly(acrylic acid) |
| 10 | 50% aqueous solution | 1.0 | 90 | 0 | Viscous liquid |
| 11 | 50% aqueous solution | 3.5 | 315 | 0 | Viscous gel |
| 12 | 50% aqueous solution + ferrous sulfate | 3.5 | 315 | 1.5% | Mobile solution |
| 13 | 50% aqueous solution + ferrous sulfate | 30 | 2700 | 12% | Mobile solution |

The products of Examples 8 through 11 were hydrophobic (not wetted by water) even after the attempted grafting. The product of Example 12 was wetted after grafting while the product of Example 13 was swelled by water after grafting.

EXAMPLE 14

An attempt was made to duplicate Example 26 of U.S. Pat. No. 3,298,942 except for the substitution of acrylic acid on a mole for mole basis for the styrene of the set forth patent example. With the exception of this substitution, all other parameters of the patent example were maintained the same. The result was that, after the specified amount of radiation, the product proved to be a physical mixture of acrylic acid homopolymer and the original polytetrafluoroethylene sheet in unchanged form. No grafting of acrylic acid onto the polytetrafluoroethylene had taken place.

EXAMPLE 15

Attempts were made to duplicate Example VIII of U.S. Pat. No. 2,999,056 using a polytetrafluoroethylene sheet instead of the polymer substrate set forth therein. All other conditions set forth in this Example were explicitly followed, however, after completion of the experiment no grafting onto the preformed polytetrafluoroethylene was found.

EXAMPLE 16

Attempts were made to duplicate Example XV of U.S. Pat. No. 3,099,631 using a polytetrafluoroethylene sheet instead of the polymer substrate set forth therein. All other conditions set forth in this Example were explicitly followed, however, after completion of the experiment no grafting onto the preformed polytetrafluoroethylene was formed.

EXAMPLE 17

Example 1 was repeated except that 0.07 grams of hydroquinone was substituted for ferrous ammonium sulfate. The result was that substantially only homopoly acrylic acid was formed with substantially no grafting of acrylic acid onto the polytetrafluoroethylene substrate.

EXAMPLE 18

Example 1 was repeated except that 0.1 grams of benzoquinone was substituted for the ferrous ammonium sulfate. The result was substantially no homopolymerization or grafting.

EXAMPLE 19

Example 1 was repeated substituting 0.05 grams of copper chloride for the ferrous ammonium sulfate. Comparable results were achieved.

The membranes produced in the above examples 1 through 7 have an electrical resistance, measured in 6 N potassium, of less than 600 ohms per cm. of thickness and per sq. cm. of area.

The capacity of these membranes as ion exchangers varies from 1.7 to 2.4 milliequivalents of NaOH per gram of dry product with the lower limit corresponding to 13 percent by weight of grafting and the upper limit to 18 percent by weight of grafting.

The ultimate breaking strength of the membranes is the same as for the ungrafted perhalogenated olefin sheets, as for example 310 kg/sq. cm. in connection with polytetrafluoroethylene. The maximum elongation of the membranes is slightly less than that of the corresponding ungrafted sheets, as for example 130 percent as compated to 240 percent. The mechanical properties of the membranes do not vary after prolonged use, as for example after one month of standing in 6N potassium solution.

These properties furthermore do not modify nor deteriorate after prolonged treatment at high temperatures as for example, after being subjected for 100 hours to a temperature of 120° C in a dry atmosphere.

Still further, these membranes withstand without damage abrupt changes in the pH. When used, for example, in an electrolytic cell a concentrated alkaline solution may be abruptly replaced with a concentrated acid solution without any damage or deterioation to the membrane. Further, the membrane can be mounted in the dry state in a cell, and then the cell can be filled with an alkaline or acid solution without any rupture of the membrane due to swelling.

What is claimed is:

1. A process of rendering a preformed perhalogenated olefin polymer shaped article, water swellable, which polymer is selected from the group consisting of polytetrafluoroethylene and polytrifluoromonochlorethylene comprising forming a graft medium comprising an aqueous solution of a water-soluble, olefinically unsaturated addition polymerizable hydrophilic carboxylic acid selected from the group consisting of acrylic acid, methacrylic acid, ethacrylic acid, crotonic acid and maleic acid and an inhibitor for the homopolymerization of said acid comprising an inorganic salt selected from the group consisting of ferrous ammonium sulfate and copper chloride; immersing at least a portion of said pre-formed shaped article into said grafting medium, and thereafter irradiating such for a time and at a dosage rate between $10^2$ and $10^6$ rads to graft said acid onto said polymer throughout said article.

2. Process claimed in claim 1, wherein said acid is acrylic acid and said polymer is polytetrafluoroethylene.

3. Process claimed in claim 1, including masking a portion of said article during irradiation.

4. Process claimed in claim 1, wherein said inhibitor is 0.1 to 1.0 percent by weight of said grafting medium and said acid is 20 to 80 percent by weight of said grafting medium.

5. A process according to claim 1 wherein said inorganic salt is ferrous ammonium sulfate.

* * * * *